United States Patent [19]

Kimura

[11] Patent Number: 4,831,449
[45] Date of Patent: May 16, 1989

[54] TELEVISION APPARATUS INCORPORATING RECEIVER AND VIDEO TAPE RECORDER IN A COMMON CABINET

[75] Inventor: Hisashi Kimura, Kanagawa, Japan

[73] Assignee: Sony Corp., Tokyo, Japan

[21] Appl. No.: 185,966

[22] Filed: Apr. 25, 1988

[30] Foreign Application Priority Data

May 21, 1987 [JP] Japan .................................. 62-125451

[51] Int. Cl.[4] ......................... H04N 5/60; H04N 5/64; H04N 5/74
[52] U.S. Cl. ................................ 358/198; 358/231; 358/254
[58] Field of Search ............... 358/198, 231, 254, 336, 358/340, 167, 60, 327

[56] References Cited

U.S. PATENT DOCUMENTS 4,755,881  7/1988  Bartlett ................................ 358/254

FOREIGN PATENT DOCUMENTS 79313  7/1978  Japan ................................... 358/190

OTHER PUBLICATIONS

The Built-In VCR, Washington Post, Jan. 30, 1986, "Washington Home", p. 15.

Primary Examiner—Tommy P. Chin
Attorney, Agent, or Firm—Alvin, Sinderbrand, Curtis, Morris & Safford

[57] ABSTRACT

In a television apparatus having a television receiver, a video tape recorder for recording and reproducing video and audio information included in a received television signal and being susceptible to distortion of the recorded video information when subjected to vibrations at substantially a predetermined mechanical resonant vibration frequency, speakers for audibly reproducing the audio information of the television signal, and a single cabinet containing the television receiver, the video tape recorder and the speakers so that the video tape recorder is influenced by vibrations generated in response to operation of the speakers; an audio signal processor which acts on the received and reproduced audio information to provide an audio output signal for driving the speakers includes a suppression circuit operative in at least the recording mode of the video tape recorder for relatively suppressing at least a component of the audio output signal having substantially the predetermined mechanical resonant vibration frequency.

13 Claims, 4 Drawing Sheets

TELEVISION APPARATUS INCORPORATING RECEIVER AND VIDEO TAPE RECORDER IN A COMMON CABINET

BACKGROUND OF THE INVENTION

1. Field of the Invention

This invention relates to television apparatus and, more particularly, is directed to a television apparatus of the type including a television receiver and a video tape recorder integrally incorporated therein.

2. Description of the Prior Art

It is known to provide a television receiver with a video tape recorder integrally incorporated in the cabinet of the television receiver which also houses or supports a speaker or speakers. Such arrangement provides a convenient and compact assembly. Moreover, with such assembly, a television signal received by a tuner of the television receiver is recordable in a tape cassette by the video tape recorder while the video information and audio information included in the television signal are respectively displayed by the display screen and reproduced by the speakers of the television receiver. Similarly, the video and audio information recorded in a tape cassette can be reproduced therefrom by the video tape recorder for display and reproduction by the display screen and speakers, respectively, of the television receiver.

However, when a television receiver has a video tape recorder incorporated therein, as described above, it is usually unavoidable that, as the level of the audio output of the speakers is increased, the cabinet, chassis, component parts and the like are made to vibrate at inherent resonant frequencies thereof which are included in the reproduced sound, and this may cause noise or distortions in the reproduced picture, particularly when a mechanical resonant vibration frequency of the video tape recorder is included in the reproduced sound during a recording operation. Such noise or distortion results from a harmful effect exerted on the transport of the tape by mechanical vibration of the video tape recorder during its recording operation, as when the video information and audio information of a television signal are being recorded simultaneously with the monitoring of the television signal by the television receiver and there is a high-level audio output from the speakers thereof which includes substantially a mechanical resonant vibration frequency of the video tape recorder.

OBJECTS AND SUMMARY OF THE INVENTION

Accordingly, it is an object of this invention to provide a television apparatus which includes a television receiver, a video tape recorder and speakers incorporated within a common housing or cabinet, and which avoids the above mentioned disadvantages of the prior art.

More specifically, it is an object of this invention to provide a television apparatus having a television receiver, a video tape recorder for recording and reproducing video and audio information included in a received television signal, speakers for audibly reproducing the audio information of the television signal, and a cabinet containing the television receiver, the video tape recorder and the speakers, and in which distortion of the recorded video information is avoided even though, during the recording of the television signal, the speakers are simultaneously operative to audibly reproduce audio information which includes a mechanical resonant vibration frequency of the video tape recorder.

In accordance with an aspect of this invention, a television apparatus comprises television receiving means for receiving a television signal that includes video and audio information; video recording and reproducing means for recording and reproducing the television signal in respective operating modes and having a mechanical resonant vibration frequency; speaker means for audibly reproducing the audio information of the television signal; a single cabinet in which the television receiving means, the video recording and reproducing means and the speaker means are integrally incorporated; and audio signal processing means receiving the audio information of the television signal as received by the television receiving means and as reproduced by the video recording and reproducing means and providing an audio output signal for correspondingly operating the speaker means, such audio signal processing means including suppression means operative in at least one of the operating modes of the video recording and reproducing means for relatively suppressing at least a component of the audio output signal having substantially the mechanical resonant vibration frequency of the video recording and reproducing means.

In accordance with another aspect of this invention, in a television apparatus, as aforesaid, the suppression means includes filter means operative to relatively suppress the component of the audio output signal having substantially the mechanical resonant vibration frequency, and switch means connected with the filter means and actuable to render the latter operative, particularly when the video recording and reproducing means is in its recording mode.

In accordance with still another aspect of this invention, in a television apparatus, as aforesaid, the audio signal processing means further includes volume control means for varying the level of the audio output signal supplied to the speaker means, and means responsive to the volume control means for determining the extent to which the suppression means is operative for relatively suppressing at least the component of the audio output signal which has substantially the mechanical resonant vibration frequency of the video recording and reproducing means.

The above, and other objects, features and advantages of this invention will be apparent in the following detailed description of illustrative embodiments when read in connection with the accompanying drawings, in which corresponding parts are identified by the same reference numerals in the several views.

DETAILED DESCRIPTION OF THE PREFERRED EMBODIMENTS

Figure 1:
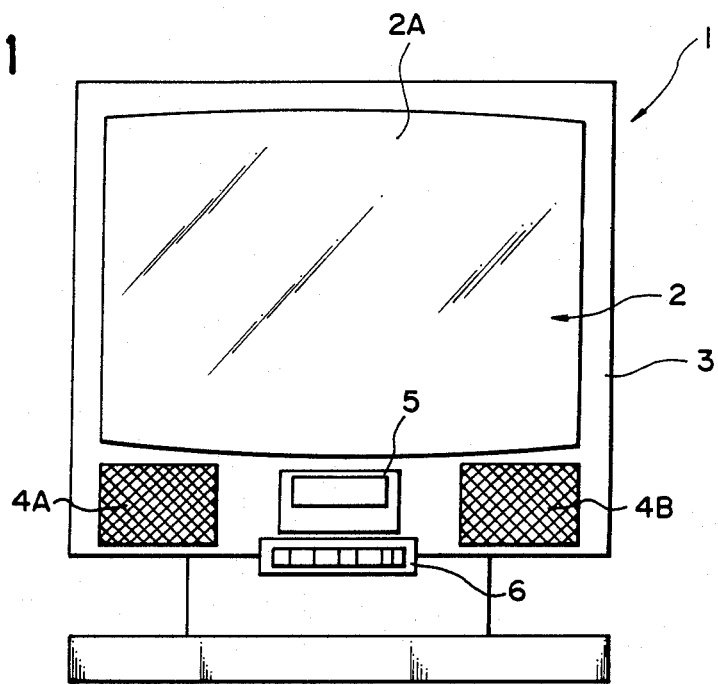
FIG. 1 is a front elevational view of a television apparatus of a type to which the present invention may be advantageously applied.

Referring initially to FIG. 1, it will be seen that a television apparatus 1 of a type to which the present invention may be advantageously applied comprises a television receiver 2 contained within a cabinet 3 and having conventional circuit arrangements for receiving a broadcast television signal and for extracting the video and audio information conventionally included in such signal. The television receiver 2 is shown to be of the direct-viewing type in which an image or picture corresponding to the video information in the received television signal is displayed on a screen or face plate 2A of a cathode ray tube that is exposed to view at the front of the cabinet 3. Speakers 4A and 4B are mounted at the opposite side portions of the cabinet 3 below the television receiver 2, and a video recording and reproducing device 5, for example, constituted by an 8mm video tape recorder (VTR) or the like, is also disposed in the cabinet 3 centrally between the speakers 4A and 4B. A suitable control panel 6 may be conveniently provided at the front of the cabinet 3 below the VTR 5. It will be appreciated that the above described television apparatus 1 is symmetrical in appearance and functionally convenient as well as providing a very compact arrangement.

In such television apparatus 1, a broadcast television signal received by the television receiver 2 may be recorded in a tape cassette by the VTR 5 while the video and audio information included in the received television signal are being simultaneously displayed on the display screen 2A and reproduced by the speakers 4A and 4B, respectively. Alternatively, in the reproducing or playback mode of the VTR 5, the video information and the audio information reproduced from a tape cassette by the VTR 5 can be displayed on the screen 2A and reproduced by the speakers 4A and 4B, respectively.

Figure 3:
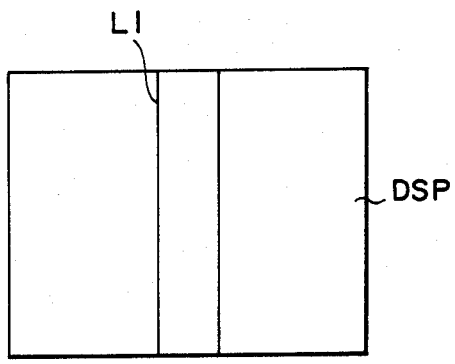
FIG. 3 is an diagrammatic view illustrating the display screen of a television apparatus of the type illustrated in FIG. 1 or FIG. 2, and showing a distortion-free image displayed thereon.
Figure 4:
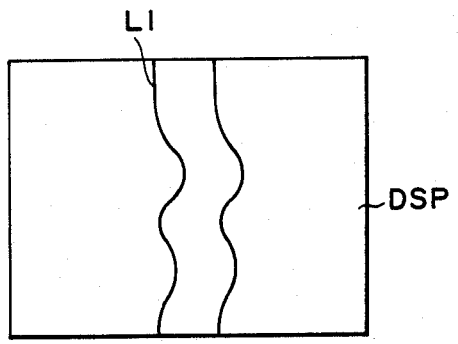
FIG. 4 is a view similar to that of FIG. 3, but showing the "image shake" or distortion that is removed or avoided in accordance with the present invention.

However, in a television apparatus 1 of the type described above with reference FIG. 1, when the level of the audio output from the speakers 4A and 4B is increased, the housing or cabinet, chassis, component parts and the like of the apparatus may be made to mechanically vibrate at inherent resonant frequencies thereof which are included in the audio output. By reason of such vibrations, noise or distortions may appear in the reproduced picture, particularly when the vibrations are generated in the VTR 5. It has been particularly confirmed that, if the video information and audio information contained in a received television signal are simultaneously displayed on the screen 2A and reproduced by the speakers 4A and 4B while the VTR 5 is in its recording mode for recording such video and audio information and the level of the sound issuing from the speakers 4A and 4B is sufficiently high to cause vibration of the VTR 5, upon subsequent reproducing of the recorded video information, there may be a so called "image shake" or distortion in the resulting displayed picture. For example, if video information corresponding to a picture or image having a vertical linear portion L1 when reproduced on a display screen DSP, as shown on FIG. 3, is recorded by the VTR 5 while the latter is being subjected to a mechanical vibration, the subsequent reproducing of such recorded video information by the VTR 5 may result in a displayed picture having "image shake", that is, a picture in which the linear portion L1 is distorted horizontally particularly at its mid-portion, as shown on FIG. 4. Such phenomenon results from a disturbance of the transport of the record tape by the mechanical vibration to which the VTR is particularly subjected when the broadcast television signal is being recorded while a high-level audio output is being provided by the speakers 4A and 4B. Further, the noted distortion or noise in the recorded video information tends to increase with reduction of the width of the tape used in the VTR 5. Thus, an 8mm VTR is especially susceptible to the described image distortion when subjected to mechanical vibrations.

Figure 5:
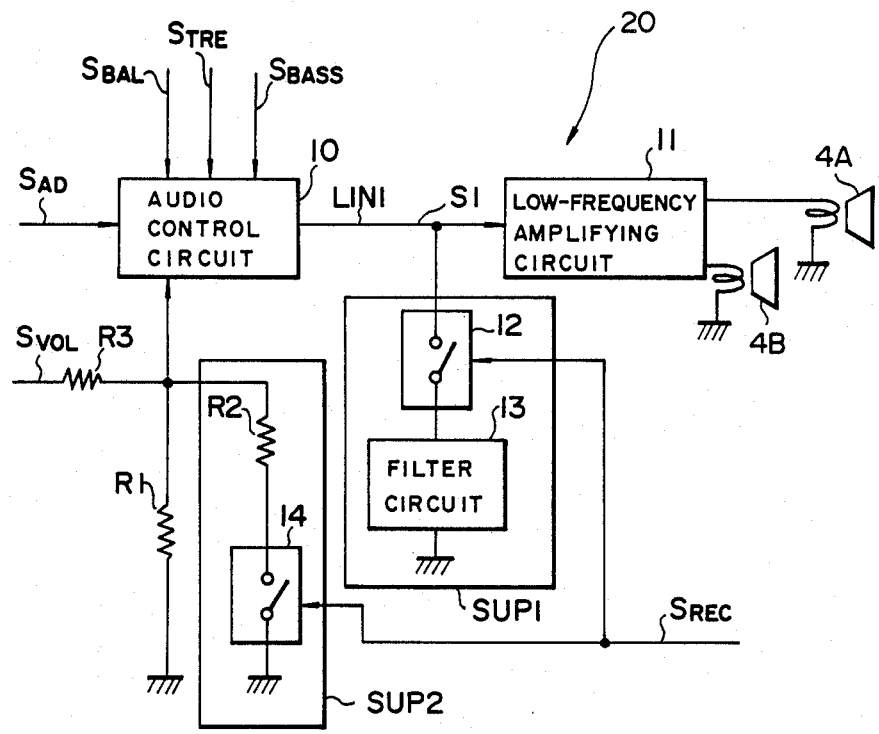
FIG. 5 is a block diagram of an audio signal processing circuit in accordance with an embodiment of the present invention, and which may be used in a television apparatus of the type shown in either of FIGS. 1 and 2 for avoiding the distortion shown on FIG. 4.
Figure 6:
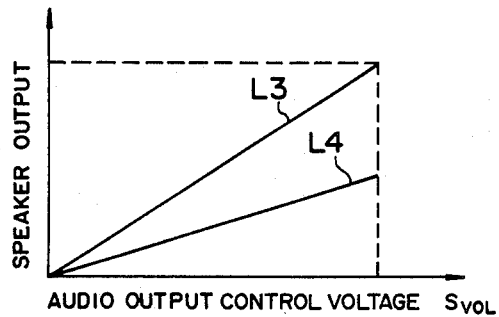
FIG. 6 is a graphic illustration of the relationship between a variable audio output control voltage and the speaker output for different modes of the video recording and reproducing device in the case of the embodiment of this invention shown on FIG. 5.

Referring now to FIG. 5, it will be seen that, in accordance with an embodiment of this invention, the television apparatus 1 of FIG. 1 is provided with an audio signal processing circuit 20 which includes an audio control circuit 10 receiving an audio input signal or information $S_{AD}$ which is either separated from the received broadcast television signal by suitable circuits (not shown) of the television receiver 2 or separated from the television signal reproduced by the VTR 5 in the reproducing or playback mode of the latter. The audio control circuit 10 further receives a left-right balance adjusting signal $S_{BAL}$, a high-range or treble adjusting signal $S_{TRE}$ and a low-range or bass adjusting signal $S_{BASS}$ and, in response thereto, is conventionally operative to vary the balance and frequency characteristics of the input audio signal $S_{AD}$. Further, as hereinafter described in detail, the audio control circuit 10 is responsive to a DC audio output control voltage $S_{VOL}$ which is varied in response to actuation of a volume control on the panel 6 for changing the level of the resulting audio output signal S1 supplied along an output line LIN1 from audio control circuit 10 through a low-frequency or audio amplifying circuit 11 to the speakers 4A and 4B. It will be appreciated that, as the audio output control voltage $S_{VOL}$ is varied, the level of the audio output signal S1, and hence, of the speaker output is similarly varied, with the relationship of the varying audio output control voltage $S_{VOL}$ and the speaker output level being normally in accordance with the line L3 on FIG. 6. In other words, the speaker output level varies with changes in the audio output control voltage in accordance with the line L3 at least when the VTR 5 is inoperative, that is, when the audio input signal $S_{AD}$ is derived from the received broadcast television signal.

Figure 7:
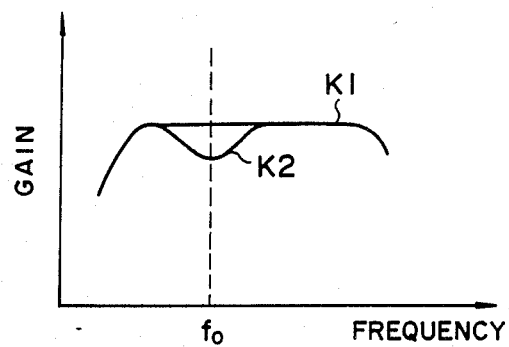
FIG. 7 is a graphic illustration of the manner in which the audio output signal is relatively suppressed in the embodiment of the invention illustrated on FIG. 5.

The audio signal processing circuit 20 is further shown to comprise a resonant-frequency component suppression circuit SUP1 and an audio volume suppression circuit SUP2. The resonant frequency component suppression circuit SUP1 includes a normally open switch circuit 12 and a filter circuit 13 connected in series between the output signal line LIN1 and ground. In the embodiment illustrated on FIG. 5, the switch circuit 12 is closed in response to a recording mode signal $S_{REC}$ which is obtained from the VTR 5 in response to establishing of the recording mode of the latter. Thus, when the VTR 5 is in its recording mode, switch 12 is closed to connect the audio output line LIN1 to ground through the filter circuit 13. The filter circuit 13 has a frequency characteristic selected so that, if the audio output signal S1 is assumed to include frequency signal components represented by a frequency characteristic curve K1 on FIG. 7, a component of the audio output signal S1 having substantially the mechanical resonant vibration frequency $f_0$ will be suppressed, as indicated by the frequency characteristic curve K2 on FIG. 7. Such frequency $f_0$ is suitably predetermined to be a mechanical resonant vibration frequency of the VTR 5, that is, a vibration frequency that causes "image shake" in the VTR 5.

In the embodiment of FIG. 5, the audio output control voltage $S_{VOL}$ is applied to one end of a series circuit of resistors R1 and R3 which, at its other end, is connected to ground, and which has a junction point between the resistors R1 and R3 connected to the audio control circuit 10. The audio volume suppression circuit SUP2 is shown to include a resistor R2 connected in series with a normally open switch circuit 14 between ground and the junction point between resistors R1 and R3. The switch circuit 14 is also adapted to be closed in response to the recording mode signal $S_{REC}$, whereupon, resistor R2 is connected to ground in parallel with the resistor R1 so as to reduce the effective control voltage applied to the audio control circuit 10. In other words, when the VTR 5 is in its recording mode, the closing of switch circuit 14 in response to the recording mode signal $S_{REC}$ causes the speaker output level to be varied along the line L4 of FIG. 6 in response to changes in the audio output control voltage $S_{VOL}$.

In a normal reception display mode of the television apparatus 1 embodying the present invention, the VTR 5 is inoperative and video information included in the received broadcast television signal is displayed on the screen 2A, while the input audio signal $S_{AD}$ corresponding to audio information included in the received broadcast television signal is adjusted in the audio control circuit 10 in accordance with the audio output control voltage $S_{VOL}$, the left-right balance signal $S_{BAL}$, the treble-adjust signal $S_{TRE}$ and the base-adjust signal $S_{BASS}$ to provide the corresponding audio output signal S1 which is fed through the low-frequency amplifying circuit 11 to the speakers 4A and 4B for audible reproduction by the latter.

In a reception display and recording mode in which the video information and audio information of the received broadcast television signal are displayed on the screen 2A and audibly reproduced by the speakers 4A and 4B while being recorded simultaneously by the VTR 5, the switch circuits 12 and 14 are closed in response to the recording mode signal $S_{REC}$. As a result of the foregoing, at least a component of the audio output signal S1 having substantially the mechanical resonant vibration frequency $f_0$ of the VTR 5 is relatively suppressed, that is, suppressed relative to the frequency components of the output audio signal S1 apart from the frequency $f_0$. Further, as a result of the connection of the resistor R2 to ground, the level of the audio output signal S1 is suppressed across the full range of its frequencies.

By reason of the foregoing, the entire energy level of the sound generated by the speakers 4A and 4B is decreased and, simultaneously, the energy level of the frequency signal component corresponding to the mechanical vibration resonant frequency $f_0$ most responsible for the "image shake" in the VTR 5 is further suppressed by the operation of the filter circuit 13. Consequently, sound induced mechanical vibrations in the VTR 5 are effectively avoided during its recording operation. Therefore, when the video information recorded by the VTR 5 in the absence of any mechanical vibration thereof is subsequently reproduced, the resulting picture or image displayed on the screen 2A is free of any "image shake".

Figure 8:
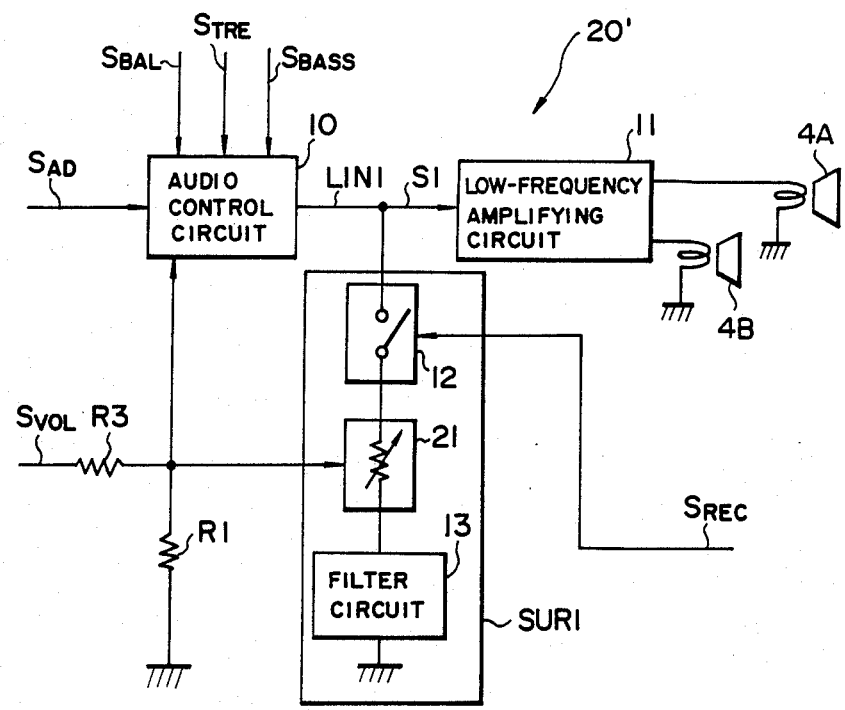
FIG. 8 is a block diagram similar to that of FIG. 5, but illustrating another embodiment of this invention.

Referring now to FIG. 8, it will be seen that, in a television apparatus according to another embodiment of the invention and in which elements corresponding to those described above with reference to FIG. 5 are identified by the same reference letters and numerals, an audio signal processing circuit 20′ includes a suppression circuit SUR1 in place of the suppression circuits SUP1 and SUP2 in the audio signal processing circuit 20 of FIG. 5. In the suppression circuit SUR1, a variable resistor circuit 21 is interposed in the series circuit of the switch circuit 12 and the filter circuit 13. The variable resistor circuit 20 is controlled by the voltage at the junction point between the resistors R1 and R3, that is, the volume control voltage applied to the audio control circuit 10, so that the resistance value of the resistor 21 is varied inversely in respect to changes in the volume or level of the audio output signal S1 by the audio output control signal $S_{VOL}$.

In operation of the embodiment illustrated on FIG. 8, when the VTR 5 of the associated television apparatus is in its recording mode, the recording mode signal $S_{REC}$ closes the switch circuit 12 with the result that the variable resistor 21 and the filter circuit 13 are connected in series between the line LIN1 carrying the audio output signal S1 and ground. As in the first described embodiment, the filter circuit 13 functions to relatively suppress at least a component of the audio output signal S1 having substantially the mechanical resonant vibration frequency $f_0$, but, in this case, the extent of such suppression is determined by the variable resistor 21. More specifically, if the audio output control voltage $S_{VOL}$ is adjusted to provide a high level or volume of the sound from the speakers 4A and 4B, the resistance value of the variable resistor 21 is correspondingly decreased so as to increase the drain to ground through the filter circuit 13 from the output line LIN1, with the result that the audio output signal S1 is suppressed to an increased extent particularly with the reference to substantially the mechanical resonant vibration frequency $f_0$ of the VTR 5. In other words, in the embodiment of FIG. 8, substantially only the component of the sound generated by the speakers 4A and 4B which has the mechanical resonant vibration frequency $f_0$ is suppressed or reduced in volume to an extent determined by the adjusted volume of the sound from the speakers so as to achieve effective suppression of the resonant vibration of the VTR 5 for avoiding the previously described "image shake".

Although the audio signal processing circuits 20 and 20′ of the embodiments of this invention previously described with reference to FIGS. 5 and 8 are operative to suppress a component of the audio output signal S1 having substantially a mechanical resonant vibration frequency of the VTR 5 only during a recording operation of the latter, it is to be noted that the present invention is not limited in that respect. In other words, the switches 12 and 14 in the audio signal processing circuit 20, or the switch 12 in the audio signal processing circuit 20' may be closed whenever the VTR 5 is operated in either in its recording mode or its reproducing mode with sound being simultaneously generated by the speakers 4A and 4B.

Figure 2:
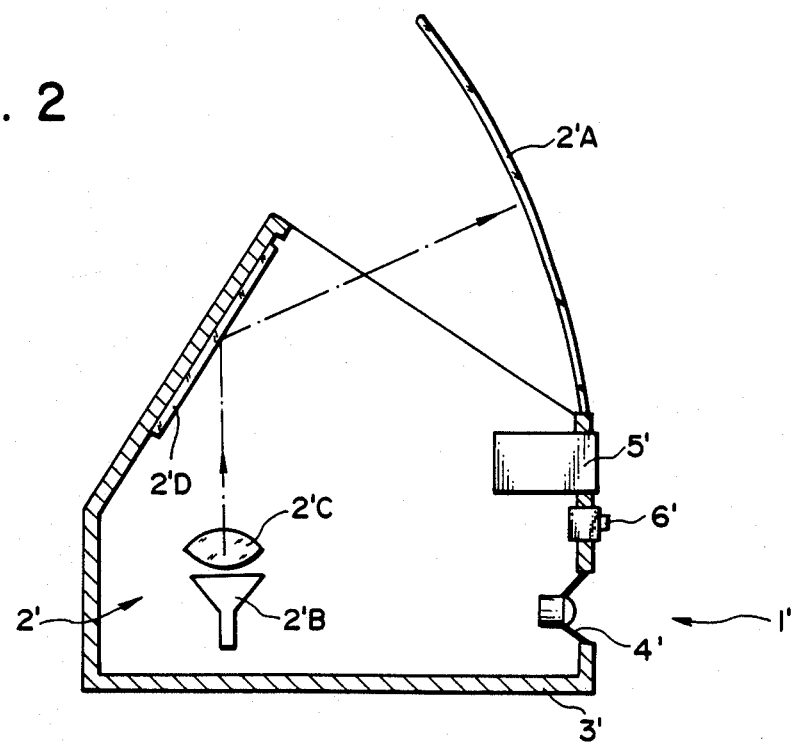
FIG. 2 is a vertical sectional view of another type of television apparatus to which this invention may be advantageously applied.

Furthermore, the present invention is not limited, in its application, to a television apparatus including a television receiver of the direct-viewing type as illustrated on FIG. 1. More particularly, the audio signal processing circuits 20 and 20' of FIGS. 5 and 8, respectively, can be employed in any television apparatus in which speakers of a television receiver are mounted in the same cabinet as a video tape recorder which may be thereby subject to vibration when the speakers generate sounds at relatively high levels. For example, as shown in FIG. 2, the embodiments of the present invention described with reference to FIGS. 5 and 8 may be applied to a television apparatus 1' which includes a projection-type television receiver 2' in which an image or picture provided on the face of at least one cathode ray tube 2'B is projected, by means of an optical system including a lens 2'C and a mirror 2'D, against the rear of a translucent screen 2'A which may be mounted on the cabinet 3' containing the television receiver 2' or spaced therefrom. The television apparatus 1' is further shown to include speakers 4', a VTR 5' and a control panel 6' all contained in or mounted on the cabinet 3' so that the generation of sounds at high levels by the speakers 4' is again likely to cause vibrations in the VTR 5'. Thus, in accordance with the present invention, the provision of the television apparatus 1' with the audio signal processing circuit 20 or 20' in accordance with this invention for suppressing at least a component of the audio output signal having substantially a mechanical resonant vibration frequency of the VTR 5' is effective to reduce or eliminate the "image shake" that might otherwise appear in a picture displayed in response to reproducing of a television signal recorded by the VTR 5'.

Although illustrative embodiments of this invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A television apparatus comprising:
television receiving means for receiving a television signal that includes video and audio information;
video recording and reproducing means for recording and reproducing said television signal in respective operating modes and having a mechanical resonant vibration frequency;
speaker means for audibly reproducing said audio information of the television signal;
a single cabinet in which said television receiving means, said video recording and reproducing means and said speaker means are integrally incorporated; and
audio signal processing means receiving said audio information of the television signal as received by said television receiving means and as reproduced by said video recording and reproducing means and providing an audio output signal for correspondingly operating said speaker means, said audio signal processing means including suppression means operative in at least one of said operating modes of said video recording and reproducing means for relatively suppressing at least a component of said audio output signal having substantially said mechanical resonant vibration frequency of said video recording and reproducing means and which, if applied to said speaker means would causes the later to effect mechanical resonant vibration of said video recording and reproducing means.

2. A television apparatus according to claim 1; in which said one operating mode of the video recording and reproducing means in which said suppression means is operative in said operating mode for recording the television signal.

3. A television apparatus according to claim 1; in which said suppression means includes filter means operative to relatively suppress said component of the audio output signal having substantially said mechanical resonant vibration frequency and switch means connected with said filter means and being actuable to render the latter operative.

4. A television apparatus according to claim 3; in which said switch means is actuated to make operative said filter means in response to establishment of said operating mode for recording the television signal.

5. A television apparatus according to claim 3; in which said filter means and said switch means are connected in series in a circuit for said audio output signal extending to ground in parallel with said speaker means so that closing of said switch means decreases the output level of said speaker means particularly in respect to substantially said mechanical resonant vibration frequency.

6. A television apparatus according to claim 3; in which said suppression means further includes audio volume suppression means also made operative upon actuation of said switch means for decreasing the level of said audio output signal over the frequency spectrum thereof.

7. A television apparatus according to claim 6; in which said switch means includes a first switch connected in series with said filter means in a circuit for said audio output signal extending to ground and parallel with said speaker means so that closing of said first switch decreases the output level of said speaker means particularly in respect to substantially said mechanical resonant vibration frequency, a second switch connected with said audio volume suppression means for decreasing said level of the audio output signal upon closing of said second switch, and means for closing said first and second switches upon establishing of said operating mode for recording the television signal.

8. A television apparatus according to claim 7; in which said audio signal processing means further includes audio volume control means for varying the level of said audio output signal in accordance with the level of an audio output control voltage applied to said audio volume control means; and said audio volume suppression means includes a resistor connected in series with said second switch to ground and through which said level of the audio output control voltage is decreased in response to closing of said second switch.

9. A television apparatus according to claim 6; in which said audio signal processing means further includes audio volume control means for varying the level of said audio output signal in accordance with the level of an audio output control voltage applied to said audio volume control means; said filter means and said switch means are connected in a series circuit for said output audio signal extending to ground in parallel with said speaker means; and said audio volume suppression means includes variable resistance means interposed in said series circuit and having a resistance value that is varied inversely by said audio output control voltage so that closing of said switch means decreases the output level of said speaker means to an extent determined by said level of the audio output signal and with particular emphasis on said component of said audio output signal having substantially said mechanical resonant vibration frequency.

10. A television apparatus according to claim 1; in which said audio signal processing means further includes volume control means for varying the level of said audio output signal, and means responsive to said volume control means for determining the extent to which said suppression means is operative for relatively suppressing at least said component of the audio output signal.

11. A television apparatus according to claim 1; in which said video recording and reproducing means include helical scan video tape recording and reproducing means which, at least in its recording mode, is susceptible to distortion of the video information recorded thereby while said speaker means are audibly reproducing sound including said mechanical resonant vibration frequency above a predetermined level.

12. A television apparatus according to claim 1; in which said television receiving means includes a picture tube also mounted in said cabinet and having an exposed face defining a screen for displaying said video information of the received television signal and the reproduced television signal.

13. A television apparatus according to claim 1; in which said television receiving means is of the projection type.

* * * * *